Sept. 19, 1939.  F. W. SLACK  2,173,667
MOTOR VEHICLE
Filed March 30, 1935  4 Sheets-Sheet 1
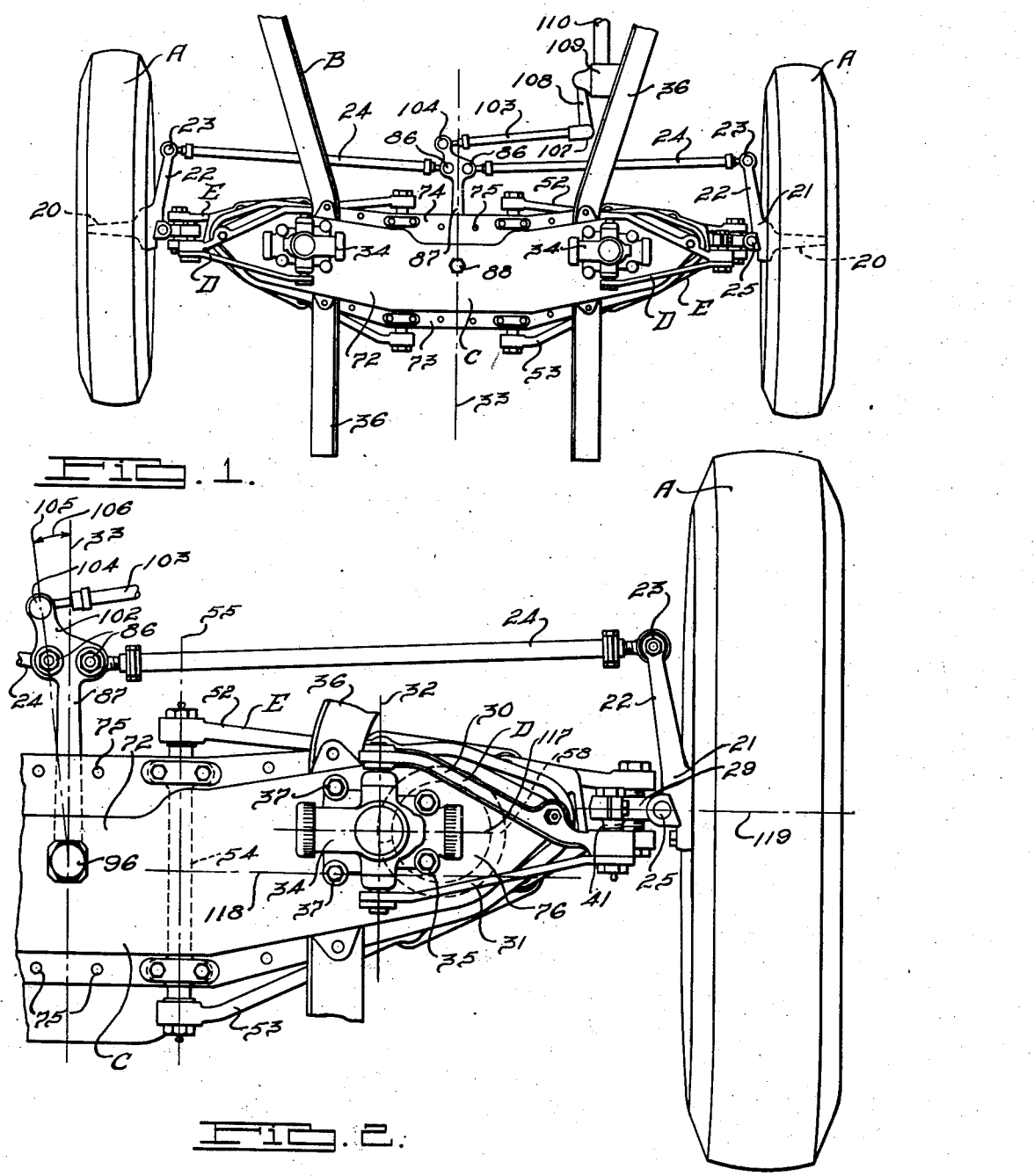
INVENTOR
Frederic W. Slack.
BY
Harness, Lind, Pater & Harris
ATTORNEYS.

Sept. 19, 1939.    F. W. SLACK    2,173,667
MOTOR VEHICLE
Filed March 30, 1935    4 Sheets-Sheet 2

INVENTOR
*Frederic W. Slack.*
BY
*Harness, Dind, Pater & Harris*
ATTORNEYS.

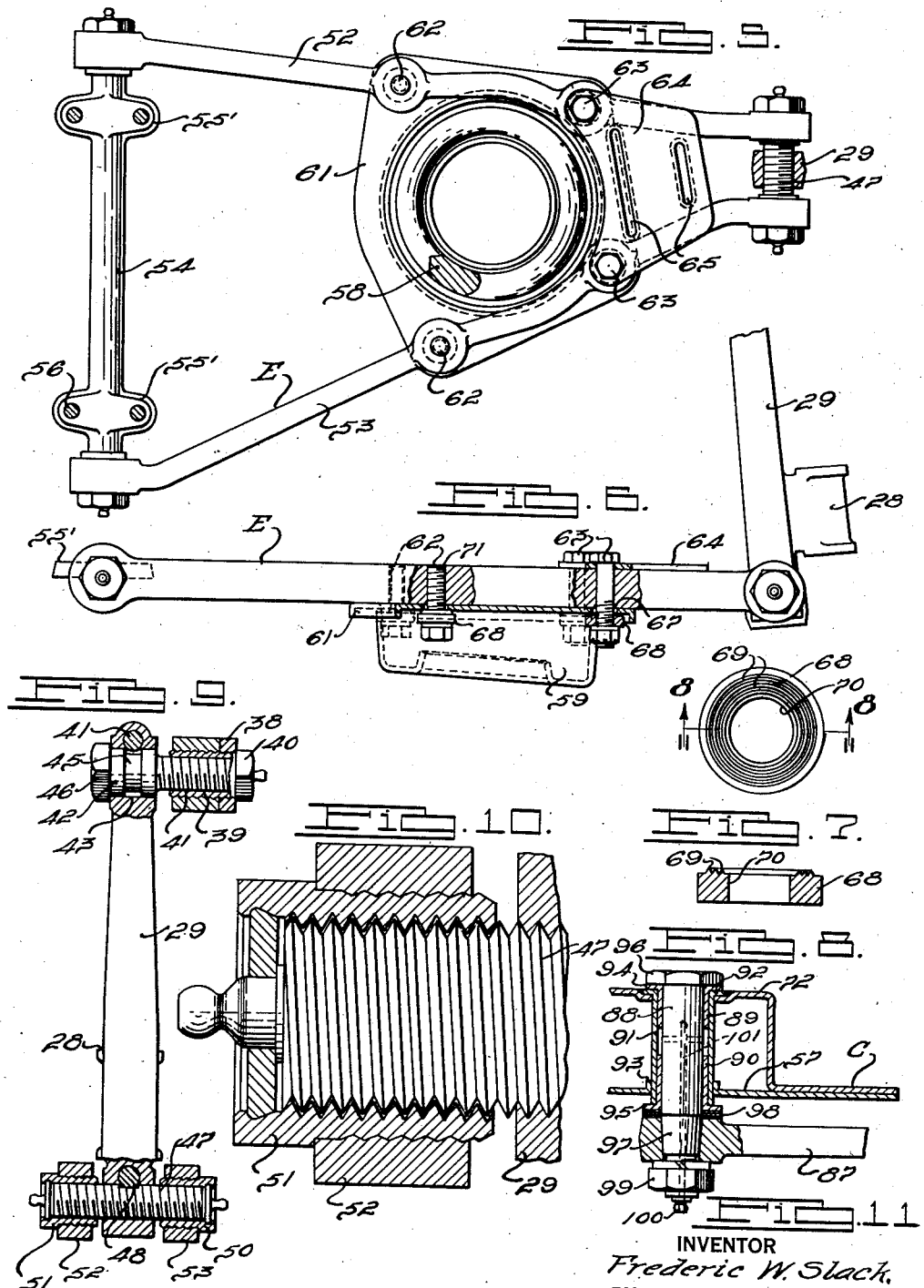

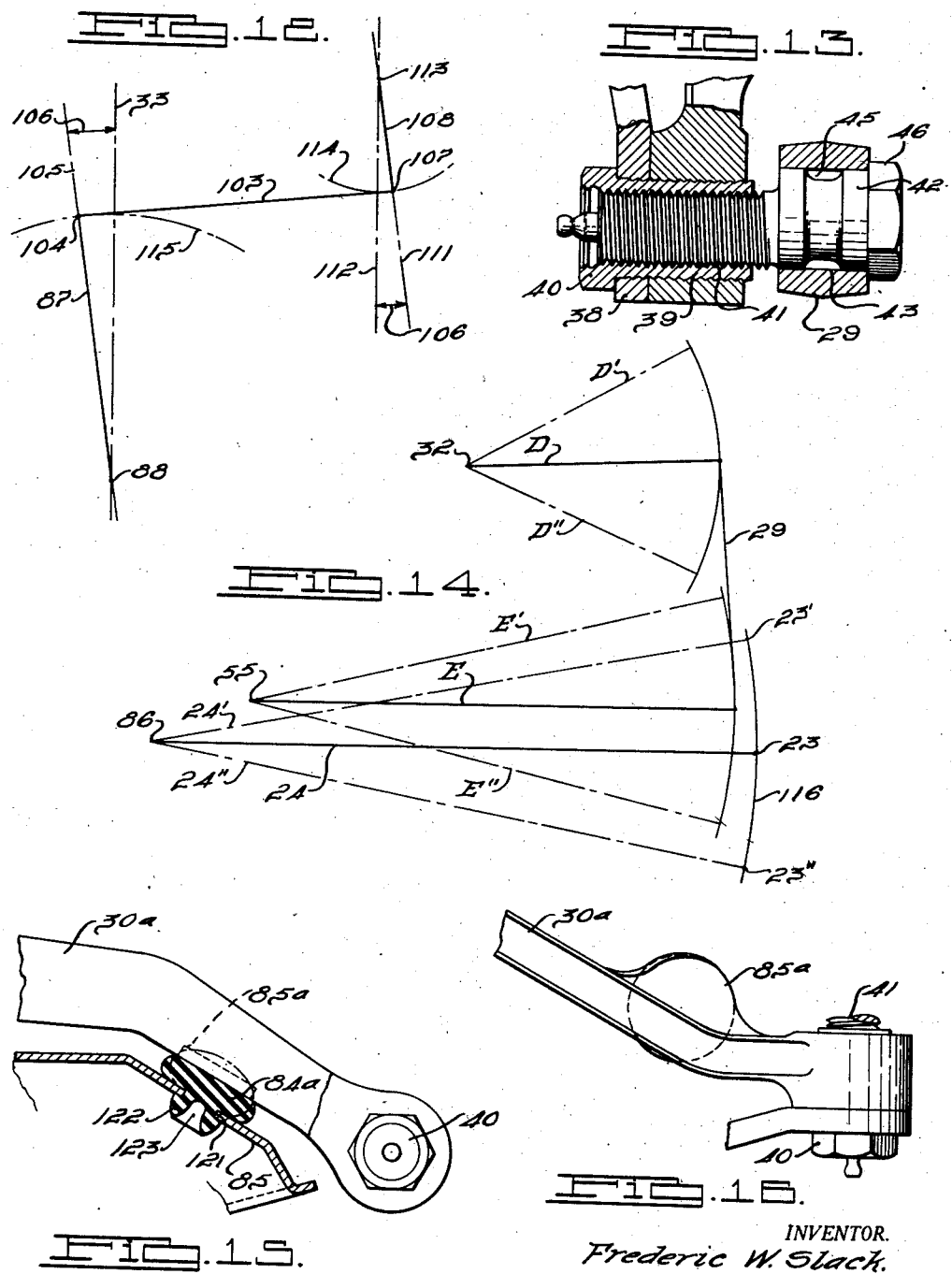

Patented Sept. 19, 1939

2,173,667

UNITED STATES PATENT OFFICE 2,173,667

MOTOR VEHICLE

Frederic W. Slack, Detroit, Mich., assignor to Chrysler Corporation, Highland Park, Mich., a corporation of Delaware Application March 30, 1935, Serial No. 13,851

20 Claims. (Cl. 280—95)

This invention relates to motor vehicles and refers more particularly to improvements in steering and suspension for the ground wheels of such vehicles.

My invention is more particularly related to motor vehicles having steerable ground wheels of the independently sprung type although in its broader aspects many of the features of my invention may be applied to non-steering ground wheels such as the rear wheels of a motor vehicle.

One object of my invention is to provide a relatively simple wheel suspension of the character referred to, capable of manufacture at relatively low cost; a suspension having improved characteristics of operation and durability; and a suspension adapted for assembly in an improved manner and method.

A further object of my invention is to provide improvements in effecting camber and caster adjustments in an independently sprung steerable ground wheel whereby such adjustments may be provided by a relatively simple mechanism easily accessible during assembly of the wheel suspension and in service thereafter.

Another object of my invention is to provide an improved steering mechanism for motor vehicle ground wheels whereby the wheels move for substantially equal amounts in opposite directions for the same amount of movement of the steering wheel in corresponding opposite directions.

Further objects and advantages of my invention will be more apparent from the following detailed description of one illustrative embodiment of my invention, reference being had to the accompanying drawings in which:

Fig. 1 is a top plan view of the front end of a vehicle illustrating my improved wheel suspension and steering mechanism.

Fig. 2 is a similar view showing the suspension for one of the wheels in enlarged form.

Fig. 5 is a sectional plan view along line 5—5 of Fig. 3 illustrating the lower wish-bone link of a wheel suspension.

Fig. 6 is a front elevational view of the Fig. 5 linkage with parts thereof broken away to illustrate the method of assembly of the wish-bone links.

Fig. 7 is an enlarged plan view of a typical washer illustrated in cross section in Fig. 6.

Fig. 8 is a sectional elevational view of the washer, the view being taken along line 8—8 of Fig. 7.

Fig. 9 is a side sectional elevational view along line 9—9 of Fig. 3 illustrating the knuckle bracket arm.

Fig. 10 is an enlarged detail view of the lower end of the arm illustrated in Fig. 9.

Fig. 11 is a detail sectional view along line 11—11 of Fig. 3, illustrating the steering guide arm pivotal support.

Fig. 12 is a diagrammatic view illustrating a part of the steering geometry.

Fig. 13 is a detail sectional plan view along line 13—13 of Fig. 3 illustrating the wheel camber and caster adjustment.

Fig. 14 is a diagrammatic side elevational view of the suspension system and steering mechanism.

Fig. 15 is a fragmentary side elevational view illustrating a modified bumper construction for the upper arm of my wheel suspension.

Fig. 16 is a detail plan view of the Fig. 15 structure.

Figure 3:
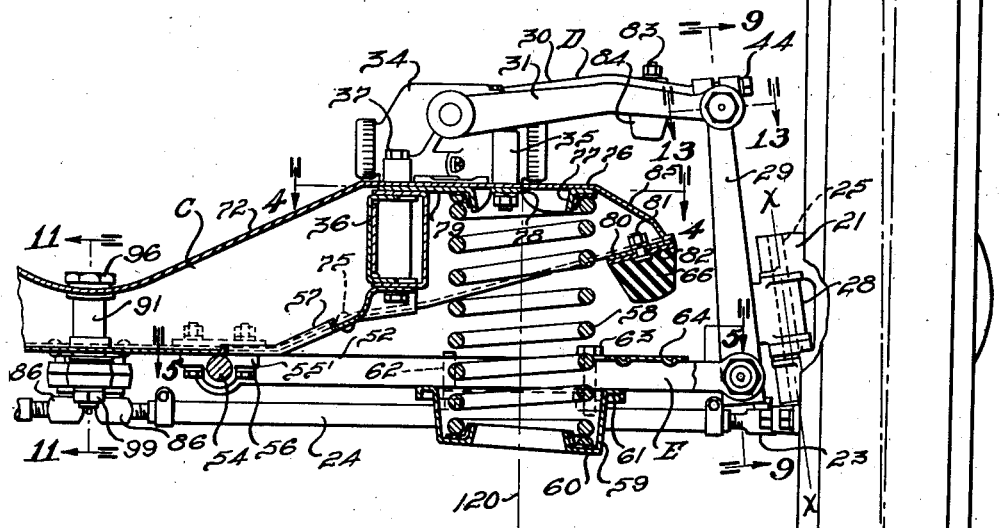
Fig. 3 is a sectional front elevational view of the Fig. 2 suspension.
Figure 4:
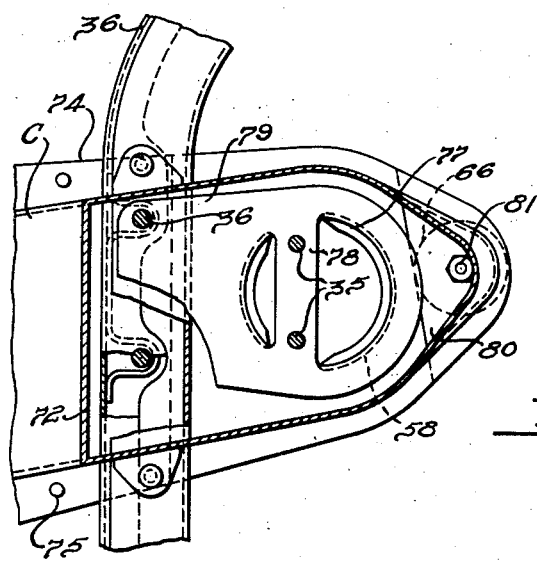
Fig. 4 is a detail sectional plan view illustrating the frame cross member and coil spring abutment, the section being taken as indicated by the line 4—4 of Fig. 3.

In the drawings reference character A represents the front steering ground wheels of the vehicle having the frame structure B which includes the fabricated cross member C. Since each wheel is preferably similarly suspended, my description will, for the most part, be directed to a representative side of the vehicle as illustrated in Figs. 2 and 3.

Each wheel is rotatably mounted on the usual spindle 20 carried by a knuckle 21 having the rearwardly extending steering arm 22 articulated at 23 to a tie rod 24 extending transversely of the vehicle and inwardly to the steering mechanism which will be presently more particularly described.

The knuckle 21 is swivelled on a king pin 25 lying on axis X—X which is generally vertical but preferably inclined upwardly and inwardly as shown in Fig. 3 to facilitate steering. With the wheel A positioned normally for straight ahead vehicle travel, the wheel plane 26 lies at an inclination laterally outwardly and upwardly from the vertical plane 27, the angle of inclination being commonly known as the camber angle. The king pin 25 is also preferably slightly inclined upwardly and rearwardly to provide the castering effect having well known desirable properties. When viewed from the side of the vehicle, the angle of the king pin axis with the vehicle is known as the caster angle.

The king pin 25 is carried by a knuckle support member 28 having a generally vertically extending wheel supporting arm 29 adapted for pivotal connection at its ends with the respective links of the suspension mechanism. The illustrated suspension is of the general parallelogram type but preferably deviates therefrom to form a trapezoid-like geometrical figure by reason of one link being shorter than another. Thus, the upper link D is shorter than the lower link E, these links being respectively articulated between the frame and the upper and lower ends of arm 29.

The upper link D is preferably of the wish-bone type having inwardly diverging arms 30, 31 pivotally supported along an axis 32 preferably extending substantially parallel to the vertical plane 33 containing the longitudinal axis of the vehicle. My wheel suspension is so constructed that it is not necessary to incline the axes of pivotal support for the suspension links D and E, as has been previously thought necessary in order to provide a suspension system which will prevent undesired wheel steering movement as the wheel rises and falls, whereby I have greatly simplified the construction and operation of the suspension system and steering mechanism cooperating therewith.

The pivotal support along axis 32 for arms 30, 31 may be provided by the hydraulic shock absorber 34 bolted at 35 to the cross-member C and to the chassis rail 36 by means of the bolts 37. The outer ends of the arms 30, 31 converge and have spaced contacts at 38, as best seen in Figs. 9 and 13, the outer ends of the arms having aligned threaded openings receiving the sleeve bushing 39 adapted to secure the arms together so as to provide in effect a unit link. The forwardly extending end of the bushing 39 is formed with a wrench engaging portion 40 adapted to engage the forward side face of the arm 31 when the bushing 39 is threadedly assembled as illustrated. This bushing is internally threaded for receiving the threaded pivot pin 41 which projects as a cantilever rearwardly from the outer ends of the arms 30, 31. The outboard end portion of the pivot pin is provided with an eccentric 42 fitting the cylindrical opening 43 formed in the upper end of the knuckle support arm 29. The upper end of arm 29 above the opening 43 is yoked for adjustably clamping the eccentric 42, a screw bolt 44 being adapted to draw together the yoked portions of the arm while engaging the annular recess 45 provided in the eccentric in order to hold the latter against axial movement with respect to the arm. The rearwardly extending end of pin 41 is provided with a wrench engaging head portion 46 for rotatably adjusting the pin in the bushing 39. It will be noted that the angularity longitudinally of the vehicle of the arm 30 is greater than that of arm 31 whereby the outer ends of the arms are spaced longitudinally of the vehicle from a lateral plane perpendicular to axis 32 and midway between the inner ends of arms 30, 31.

At its lower end the arm 29 threadedly receives the lower pivot pin 47 which lies parallel to the upper pivot pin 41. In order to secure the pin 47 to the arm 29, the latter is provided with a locking pin 48 of the usual well-known type.

The opposite ends of the threaded pin 47 are threadedly journaled in the internal threads of bushings 50, 51 respectively, whereby to provide the desired pivoting of the lower end of arm 29 with respect to the lower link E when the wheel associated therewith rises and falls with respect to the vehicle frame structure.

Bushing 50 is threadedly secured to the outer end of arm 53 while bushing 51 is similarly secured to the outer end of arm 52, the arms 52 and 53 comprising the lower link E. The inner ends of these arms 52, 53 are respectively journaled on the oppositely extending ends of a fixed longitudinally extending support rod 54 preferably having its axis of support 55 lying parallel with axes 32 and 33. The rod 54 has enlarged securing portions 55' thereof secured by fasteners 56 to the undersurface of the lower stamped plate 57 of the cross brace C. It will be noted that arm 53 has an inclination in the longitudinal direction of the vehicle greater than that of arm 52 for positioning the lower end of arm 29 in proper relationship with respect to the pivotal connection thereof with the upper link D.

Before proceeding further with the details of the description of my suspension mechanism, I will first describe the operation of the adjusting mechanism for the caster and camber angle of the king pin 25. The eccentric 42 provides a common means for both the caster and camber adjustment which means is described and more broadly claimed in my co-pending application Serial No. 738,461, filed August 4, 1934, now Patent No. 2,115,919, dated May 3, 1938.

In making an adjustment for caster or camber, the fastener 44 is first loosened to permit rotative adjustment of eccentric 42 relative to the opening 43 of arm 29. The pivot pin 41 is then rotatably adjusted at the wrench engaging portion 46 in either a clockwise or counterclockwise direction depending on whether it is desired to increase or decrease the camber angle of the king pin for a given position of the eccentric 42 and a given direction of the threads of pivot pin 41. Usually, a small amount of rotative movement of eccentric 42 in one direction or the other will provide the desired adjustment of the wheel and king pin axis for camber. Where a material adjustment is also necessary for correcting the caster angle of the king pin, it may be necessary to impart several complete rotative movements of the pin 41 which thereby moves the upper end of arm 29 forwardly or rearwardly and when the proper caster angle has been thus produced the pin 41 is given a final rotative adjustment requiring only small arcuate movement to position the king pin axis at the proper camber angle.

As the pin 41 is rotatably adjusted it will be apparent that the upper end of arm 29 is thereby moved laterally inwardly or outwardly by the eccentric 42 and is also moved longitudinally forwardly or rearwardly by the threaded engagement of pin 41 in bushing 39. The lateral swinging movement of arm 29 is readily accommodated by the threaded engagement of the lower pivot pin 47 in the bushings 50, 51 and the longitudinal adjusting movement of the upper end of arm 29 is accommodated by reason of a relatively loose fit between the threads of pin 47 and the threads of the bushings 50, 51. In Fig. 10 I have illustrated in exaggerated form a typical connection between pin 47 and one of these bushings whereby the longitudinal axis of pin 47 is permitted to slightly tilt. In actual practice this loose fit at the threads may be from .004 to .015 of an inch, this being ordinarily sufficient to accommodate the forward and backward adjusting movement of the upper end of arm 29 when adjusting the caster angle of the king pin 25. After the desired adjustment has been made the pin 41 is clamped against relative movement with respect to arm 29 by reason of the fastener 44 as will be readily understood.

Each wheel A yieldingly supports a portion of the vehicle load preferably by reason of a spring of the coil type best shown at 58 in Fig. 3. The upper end of this spring acts against a laterally outwardly projecting portion of the cross brace C as will be presently described in detail, the lower end of the spring acting against the lower link E. For connecting the spring to the lower link I have provided a cup 59 formed with a spring receiving annular channel 60. The upper end of the cup is provided with a laterally extending border flange 61 adapted to bridge the space between arms 52 and 53 and to seat against the lower faces of these arms. These arms are provided with suitable openings adapted to threadedly receive the groove fasteners 62 and to also receive the screw bolts 63 as best seen in Figs. 5 and 6. Lying between the upper heads of bolts 63 and the upper faces of arms 52 and 53 is the abutment plate 64 having strengthening ribs 65, this plate acting as an abutment for contact with the rubber bumper 66 carried by the outer end of the cross brace C for providing a yielding limit to the upward movement of wheel A relative to the vehicle frame.

The openings in the flange 61 of cup 59 for receiving the screws 62 and bolts 63 are sufficiently large as indicated at 67 in Fig. 6 to permit relative adjusting displacement between cup 59 and arms 52, 53 when the suspension linkage is being assembled. Between the lower headed ends of screws 62 and bolts 63 I have provided a securing washer 68 formed with a series of upwardly extending sharp knurls 69 adapted to bite into the flange 61 when the parts are assembled together. Each washer 68 is provided with an opening 70 for closely receiving a screw 62 or a bolt 63. While the lower link E is of relatively simple construction, being formed of the two separate arms 52, 53, directly connected through pin 47 to the knuckle carrying arm 29, it would be difficult except for the teachings of my invention to properly locate the pivot points at the ends of arms 52, 53 together with the location of coil spring 58 without introducing stresses in these arms tending to produce binding at the pivot points of the arms.

One important feature of my invention resides in a method of assembly and a construction of the link E whereby the pivot points of arms 52, 53 may be conveniently located along with coil spring 58 without producing any binding action in the linkage mechanism and without requiring greater accuracy in the location and assembly of these parts than is customary shop practice. In assembling the parts of the link E, I first assemble the arms 52, 53 loosely with respect to the inner pivots on rod 54 and outer pivots on pin 47, the screws 62 and bolts 63 also loosely locating the spring cup 59 so that all parts of the linkage mechanism may adjust themselves without stress. During this self-adjusting assembly, it will be noted that the spring cup 59 which transmits the load of the link E is capable of a shifting movement in any direction in the general plane of the link by reason of the clearances 67.

The washers 68 are then struck upwardly so that the knurls 69 thereof bite into the flange 61 of the spring cup whereby the spring cup is then securely located and fixed with respect to screws 62, bolts 63, and hence also with respect to the arms 52, 53 of link E. These screws and bolts are then tightly secured in position and the openings for screws 62 are staked in at 71 to hold the screws in position. In this manner the arms 52, 53 are rigidly connected together as a unit without stressing the threaded bearings.

Referring now to the frame structure B including the cross member C, it will be noted from Fig. 1 that the longitudinally extending side rails 36 converge at the forward end of the vehicle to provide forwardly extending terminal portions brought relatively closely together. The cross member C comprises a fabricated hollow structure having the aforesaid bottom plate 57 and an upper plate 72 formed with front and rear laterally extending flanges 73, 74 respectively, riveted at 75 (see Figs. 2 and 3) to the bottom plate 57. The front and rear downwardly extending walls of the plate 72 are provided with pairs of longitudinally aligned openings through which the forwardly projecting ends of the rails 36 extend. The lower plate 57 terminates below the rails 36 as best seen in Fig. 3 in order to accommodate the coil spring 58 while the upper plate 72 projects laterally beyond each of the side rails to provide an outboard portion 76 at each side of the vehicle and against which a coil spring 58 acts.

Associated with each coil spring is an upper annular cup 77 adapted to receive and locate the upper end of the coil spring, this cup having a longitudinally extending bridge 78 through which the aforesaid bolts 35 extend to locate the shock absorber 34 and the spring cup in position on the cross brace extension 76. The cup 77 has its upper flange 79 in contact with the under face of plate extension 76, the flange 79 having an inward extension secured between a rail 36 and the upper plate 72 by the aforesaid bolts 37. In this manner the plate projection 76 is reinforced to rigidly carry the shock absorber 34 and at the same time a locating seat is provided for a coil spring 58.

Extending across the flanges 74 of plate extension 76 at the outer end thereof is a stiffener support plate 80 which is welded to flanges 74. The aforesaid rubber bumper 66 is secured by fastener 81 to the plate 80, the bumper 66 being vulcanized to its support plate 82.

In order to limit the downward displacement of wheel A relative to the vehicle frame, the arm 30 of the upper link D has secured thereto by a fastener 83, a second rubber bumper 84 projecting downwardly and adapted to engage the outwardly and downwardly sloping portion 85 of the plate extension 76 as best seen in Fig. 3.

Referring now to the means for steering the wheels A and the mechanism for preventing undesired steering movement imparted to the wheels when the latter rise and fall during normal operation of the vehicle, the tie rods 24 extend laterally inwardly toward each other from their respective points 23 of articulation with the steering arms 22, the inner ends of the tie rods being articulated at 86 closely adjacent each other on an idler guide link 87. This guide link as best seen in Fig. 11 extends forwardly beneath the cross member C for connection with a pivot pin 88 which is rotatably journaled in upper and lower bushings 89, 90 fitting the cylindrical member 91 which extends through the upper and lower plates 72, 57, respectively. The cylindrical member 91 has an upper annular flange 92 seated on upper plate 72 and welded thereto, the lower end of cylindrical member 91 extending downwardly through the flanged opening 93 of the lower plate 57. The upper and lower bushings 89, 90 are provided with annular flanges 94, 95 respectively seating on flange 92 and the lower end of cylindrical member 91. The upper end of pivot pin 88 has a head 96 contacting with flange 94, the lower end of this pin being tapered at 97 to receive the forward end of link 87, the shims 98 being located between flange 95 and link 87. The assembly is held in position by a nut 99 threadedly engaging the lower end of pin 88. The pin may be provided with a lubricating fitting 100 adapted to supply lubricant through the pin passages 101 to the bushings 89 and 90.

The rearwardly extending end 102 of link 87 projects rearwardly beyond the tie rod pivotal connections 86 and is offset to one side laterally of the axis 33 when the wheels A are in their normal positions for straight ahead vehicle movement. A drag link 103 has its inwardly extending end articulated at 104 to the offset end 102 of link 87 so that normally a plane 105 containing the axis of pivot pin 88 in passing through the pivot point 104 makes an angle 106 with the vertical plane 33.

The outer end of drag link 103 is articulated at 107 to the steering pitman arm 108 of the usual steering gear operating mechanism 109 adapted for actuation by the usual rotatable shaft 110 which projects rearwardly and upwardly into the vehicle driver's compartment (not shown) for operation by the usual steering wheel carried on the upper end thereof according to well-known practice. Normally the arm 108, as will be best apparent from the diagrammatic showing in Fig. 12, lies along an axis 111 lying at the same aforesaid angle 106 with an axis 112 parallel to plane 33. The arm 108 is adapted to swing about a pivot 113 so that the drag link operating end thereof moves along an arc 114 in imparting steering movement to wheels A. Likewise the point of articulation 104 moves about an arc 115 having the axis of pin 88 as the center.

Heretofore with the steering wheels A in their normal straight ahead position, it has been customary to arrange link 87 and arm 108 parallel to each other and also parallel to the vertical longitudinal mid-plane 33, but since the articulated point 107 is ordinarily spaced longitudinally of the vehicle from articulated point 104, such arrangement results in unequal arcs of swinging of link 87 to either side of the normal longitudinal position thereof for given equal arcs of swing of the arm 108 to either side of its normal longitudinal position. This results, therefore, in unequal steering movements of the steering wheel to the right and left for equal movements of the steering wheel in opposite directions. With my steering mechanism I have corrected the aforesaid objectionable characteristics since with my arrangement the steering wheels will move equally to the right and left for equal opposite movements of the steering wheel.

In order to determine the angles 106 for the normal positions of link 87 and arm 108, it is only necessary to arrange the drag link 103 as a common tangent of the arcs 114 and 115 and then locate link 87 and arm 108 perpendicular to the tangent. With such arrangement the link 87 will swing equally in opposite directions for a given arcuate travel of arm 108 in opposite directions from the normal position thereof as illustrated in Fig. 12.

I will now describe the manner in which the steering mechanism cooperates with the wheel suspension system to prevent undesired steering movement imparted to the wheels as they rise and fall in the normal straight ahead travel of the vehicle in accordance with the diagrammatic illustration of the parts in Fig. 14. A typical suspension system is illustrated including upper link D, lower link E, the knuckle carrying arm 29, and a tie rod 24 with its outer point of articulation 23. It will be apparent that if the point 23 does not laterally move out of the arc 116 having the articulated point 86 as a center, then there will be no steering movement imparted to the wheel as the latter is displaced upwardly and downwardly between its limits of swinging indicated respectively by the primed and double primed reference characters in Fig. 14. Inasmuch as articulated point 23 is carried by arm 29, the path of movement of such point is therefore a function of the movements of the upper and lower links of the suspension system. I have therefore selected the pivot point 86 in definite relationship with the movement of point 23 under the influence of the upper and lower links. Thus, with the parts arranged generally in Fig. 14 the path of movement of the point 23 under the influence of the upper and lower links D and E, respectively, is approximately the same as the path of movement of point 23 along arc 116 having the pivot point 86 as a center.

A further feature of my invention in one of its aspects resides in an improved arrangement of links D and E and other parts associated therewith whereby the space available for such parts is utilized in an improved manner to provide a close and efficient grouping of the parts without interference with each other. Thus, the planes 117, 118 which are respectively perpendicular to axes 32 and 55 mid-way between the frame supported pivots of the links D and E and spaced longitudinally of the vehicle from each other as best seen in Fig. 2. The vertical lateral plane 119 containing the arm 29 is also longitudinally spaced from planes 117, 118 preferably with plane 117 lying longitudinally between planes 118 and 119. The plane 119 approximately passes through the king pin axis X—X and the axis of wheel spindle 20 although the slight caster angle of the king pin may cause axis X—X to slightly deviate from such plane where knuckle support member 28 has its vertically extending axis tilted slightly longitudinally with respect to the vertical axis of arm 29.

The foregoing arrangement permits links D to be positioned relatively closely to tie rods 24 or viewed differently, link E may be moved forwardly to avoid interference with tie rod 24 without moving link D forwardly to merge planes 117 and 118. Wheel A is thus located further rearwardly to minimize the vehicle wheel base. The link arms are further arranged to position arm 29 in plane 119 approximately perpendicular to plane 33, the cantilever-like projection of pin 41 from the outer end of link D contributing to provide the novel arrangement aforesaid.

Furthermore, I have arranged the link mountings so that they will not interfere with the coil spring 58, the shock absorber bolts 35 freely lying within a vertical projection of the coil spring. Heretofore, the lateral planes of the links (corresponding to planes 117, 118) have been deemed as necessarily passing through the vertical axis 120 but, by reason of the teachings of my invention, it will be apparent that these planes may, if desired, be longitudinally spaced from each other so that they both do not pass through the coil spring axis 120.

Referring to Figs. 15 and 16, I have shown a modified form of construction for yieldingly arresting the extreme downward movement of the upper link relative to the frame structure. Thus, arm 30 of link D may be replaced with arm 30ᵃ of Figs. 15 and 16, this arm having the laterally projecting flat abutment 85ᵃ engageable with rubber bumper 84ᵃ. In this instance, the inclined portion of the projecting cross brace 76 has an opening 121 for receiving bumper 84ᵃ which has an annular groove to fit the opening. The bumper has a securing portion 122 made collapsible by recess 123 so that when inserted downwardly into opening 121 the portion 122 will yield in passing through the opening and then expand into secured position as in Fig. 15. In this figure the upper bumper position at 84ᵃ is shown deformed under the action of arm 30ᵃ. Such construction is relatively simple, easily applied, and of low cost.

What I claim is:

1. In a suspension for a steering ground wheel of a motor vehicle having a frame structure, wheel supporting and guiding means including a wheel support arm, upper and lower linkages intermediate said frame structure and said support arm, an adjustable connector between said support arm and one of said linkages, said connector having a part thereof pivotally connected to the last said linkage to provide for movement of said support arm relative to the last said linkage when the wheel is displaced relative to said frame structure, said connector having a second part thereof disposed eccentrically with respect to the pivot axis of the first said part, said eccentric second part being connected to said support arm.

2. In a suspension for a steering ground wheel of a motor vehicle having a frame structure, wheel supporting and guiding means including a wheel support arm, upper and lower linkages intermediate said frame structure and said support arm, an adjustable connector between said support arm and one of said linkages, said connector having a part thereof pivotally connected to the last said linkage to provide for movement of said support arm relative to said frame structure, said connector having a second part thereof disposed eccentrically with respect to the pivot axis of the first said part, said eccentric second part being connected to said support arm, said eccentric second part projecting cantilever-like from the last said linkage.

3. In a suspension for a steering ground wheel of a motor vehicle having a frame structure, wheel supporting and guiding means including a wheel support arm, upper and lower linkages intermediate said frame structure and said support arm, an adjustable connector between said support arm and one of said linkages for adjusting said support arm laterally and longitudinally of the vehicle to vary the wheel camber and caster respectively, said connector including a member threadedly engaging the last said linkage for pivotal movement about an axis extending longitudinally of the vehicle, said member having a portion thereof eccentrically disposed relative to said axis, and means for connecting said support arm with said eccentric portion of said member.

4. In a suspension for a steering ground wheel of a motor vehicle, a support member, a link member adapted to guide vertical displacement of said support member, and means for pivotally connecting said members including an eccentric carried by one of said members, said eccentric having a pin extending therefrom for pivotal connection with the other of said members.

5. In a suspension for a steering ground wheel of a motor vehicle, a support member, a link member adapted to guide vertical displacement of said support member, and means for pivotally connecting said members including a pin projecting cantilever-like from one of said members toward the other, said pin extending generally longitudinally of the vehicle.

6. In a suspension for a steering ground wheel of a motor vehicle, a wheel support member, a link comprising a pair of arms pivotally connected to the vehicle frame and having ends converging generally toward said support member, an internally threaded sleeve carried by and connecting the converged ends of said link arms and having its axis extending generally longitudinally of the vehicle, and means operably connecting said link and support member including a pin having threaded pivotal engagement with the threads of said sleeve.

7. In a motor vehicle, the combination with a vehicle frame structure, of a pair of road wheels disposed at opposite sides of and adjacent one end of said frame structure, means associated with each of said wheels and said frame structure for supporting and guiding said wheels for independent rising and falling movement, each of said supporting and guiding means including at least one link having arms diverging toward said frame structure, means providing a pivotal connection between the ends of said diverging arms and said frame structure, a generally vertical arm between the wheel and link, and means pivotally connecting one end of said vertical arm with the converged ends of said link arms including a pivot pin extending cantilever-like from said link arms and having its axis disposed generally longitudinally of the vehicle.

8. In a motor vehicle, the combination with a vehicle frame structure, of a pair of road wheels disposed at opposite sides of and adjacent one end of said frame structure, means associated with each of said wheels and said frame structure for supporting and guiding said wheels for independent rising and falling movement, each of said supporting and guiding means including at least one link having arms diverging toward said frame structure, means providing a pivotal connection between the ends of said diverging arms and said frame structure, a generally vertical arm between the wheel and link, and means pivotally connecting one end of said vertical arm with the converged ends of said link arms including an internally threaded bushing connecting said converged arm ends together and a pivot pin threadedly operating in said bushing and projecting cantilever-like from said arm ends generally longitudinally of the vehicle toward said vertical arm.

9. In a motor vehicle, the combination with a vehicle frame structure, of a pair of road wheels disposed at opposite sides of and adjacent one end of said frame structure, means associated with each of said wheels and said frame structure for supporting and guiding said wheels for independent rising and falling movement, each of said supporting and guiding means including a pair of generally laterally extending vertically spaced wheel support links each having a pair of arms pivotally connected at their inner ends to said frame structure for swinging movement of said links about separate parallel and substantially horizontally extending axes, said axes extending substantially parallel to the vertical longitudinal mid-plane of the vehicle, a wheel support arm articulated to the outer ends of said links, said links and pivotal axes therefor being so disposed that planes perpendicular to said axes mid-way between the pivoted ends of said link arms are spaced from each other longitudinally of said vehicle, said plane for the lower link arm pivots being disposed forwardly of the vehicle from said plane for the upper link arm pivots.

10. In a motor vehicle, the combination with a vehicle frame structure, of a pair of road wheels disposed at opposite sides of and adjacent one end of said frame structure, means associated with each of said wheels and said frame structure for supporting and guiding said wheels for independent rising and falling movement, each of said supporting and guiding means including a pair of generally laterally extending vertically spaced wheel support links each having a pair of arms pivotally connected at their inner ends to said frame structure for swinging movement of said links about separate parallel and substantially horizontally extending axes, a wheel support arm articulated to the outer ends of said links, said links and pivotal axes therefor being so disposed that planes perpendicular to said axes mid-way between the pivoted ends of said link arm are spaced from each other longitudinally of said vehicle, said wheel support arm lying in a plane extending laterally of the vehicle and spaced from said perpendicular planes longitudinally rearwardly of the vehicle.

11. In a motor vehicle, a frame structure comprising laterally spaced longitudinally extending frame rails and a cross brace member connecting said frame rails and having portions thereof projecting laterally therebeyond at each side of the vehicle, a pair of road wheels disposed at opposite sides of said frame rails respectively adjacent the projecting portions of said cross brace member, means associated with each of said wheels and said frame structure for supporting and guiding said wheels for independent rising and falling movement, each of said supporting and guiding means including upper and lower link members pivotally connected at their inner ends to said frame structure for swinging movement about separate parallel axes, means acting between each of said link members and outer end of one of said cross brace projecting portions for yieldingly limiting movement of said link members toward said cross brace projecting portion, and a coil spring extending upwardly from said lower link member to said cross brace portion, the upper end of said coil spring being disposed laterally between said yielding means and one of said frame rails.

12. In a suspension for a steering ground wheel of a motor vehicle, a wheel supporting member, a vehicle frame structure, means for guiding vertical displacement of said supporting member including a link, said link having a pair of arms diverging inwardly for pivotal supporting connection to said frame structure, means including a bushing for rigidly connecting together the outer ends of said link arms, and means for pivotally connecting one end of said supporting member to said link including a pin extending within said bushing, said pin having a cantilever eccentric portion operably connected to said supporting member.

13. In a motor vehicle, the combination with a vehicle frame structure, of a pair of steerable road wheels at opposite sides of said frame structure, means for steering said wheels including the rod means extending in a direction generally transversely of the vehicle, means associated with each of said wheels and said frame structure for supporting and guiding said wheels for independent rising and falling movement, each of said supporting and guiding means including a pair of generally laterally extending vertically spaced wheel supporting linkages, a wheel supporting arm articulated to the outer ends of said linkages, means for mounting the inner ends of each of said linkages for swinging movements about separate substantially horizontal axes parallel with the longitudinal vertical mid-plane of the vehicle, said mounting means for the lower linkage being disposed forwardly of the vehicle adjacent said tie rod means, the transverse mid-plane of the inner end of the upper linkage being disposed rearwardly of the transverse mid-plane of the inner end of the lower linkage to accommodate positioning of said tie rod means relatively closely to said mounting means for said upper linkage in a direction longitudinally of the vehicle, and to accommodate operation of said tie rod means without interfering with said lower linkage and said mounting means therefor.

14. In a motor vehicle, a frame structure comprising laterally spaced longitudinally extending frame rails and a cross brace member connecting said frame rails and having portions thereof projecting laterally therebeyond at each side of the vehicle, a pair of road wheels disposed at opposite sides of said cross brace member, means associated with each of said wheels and said frame structure for supporting and guiding said wheels for independent rising and falling movement, each of said supporting and guiding means including upper and lower link members pivotally connected at their inner ends to said frame structure for swinging movement about separate parallel axes, a coil spring extending upwardly from each of said lower link members to a projecting portion of said cross brace member, means acting between each of said lower link members and an outer end of one of said cross brace projecting portions for yieldingly limiting movement of said lower link members toward said cross brace projecting portions, the upper end of each of said coil springs being disposed laterally between one of said yielding means and one of said frame rails, each of said cross brace projecting portions having a lower edge inclined outwardly and upwardly relative to an associated frame rail to provide an inclined seat for one of said yielding means.

15. In a suspension for a steering ground wheel of a motor vehicle having a frame structure, wheel supporting and guiding means including a wheel support arm, upper and lower linkages intermediate said frame structure and said support arm, one of said linkages including a pair of link arms converging outwardly from said frame structure, adjustable pivotal connecting means between said support arm and the last said linkage including a cantilever member extending from the converged ends of said link arms generally longitudinally of the vehicle for connection to said wheel support arm, said cantilever member carrying an eccentric operably connected with said support arm and adjustable to vary the "camber" setting of said wheel.

16. In a suspension for a steering ground wheel of a motor vehicle, a wheel support member, means including a link member adapted to guide vertical displacement of said support member, and means for pivotally connecting said members including a support element threaded to provide pivotal movement of said members about an axis disposed generally longitudinally of the vehicle, said support element extending cantilever-like from one of said members to the other.

17. In a suspension for a steering ground wheel of a motor vehicle, a support member, a link member adapted to guide vertical displacement of said support member, and means for pivotally connecting said members including a pin projecting cantilever-like from one of said members toward the other, said pin extending generally longitudinally of the vehicle, said pin having a threaded portion thereof providing the pivotal connection between said members.

18. In a suspension for a steering ground wheel of a motor vehicle, a support member, a link member adapted to guide vertical displacement of said support member, and means for pivotally connecting said members including a pin projecting cantilever-like from one of said members toward the other, said pin extending generally longitudinally of the vehicle, said pivotal connecting means including an internally threaded bushing carried by one of said members, said pin having a threaded portion thereof engaging the threads of said bushing to provide the pivotal connection between said members.

19. In a suspension for a steering ground wheel of a motor vehicle, an upright support structure, a swinging wishbone linkage structure comprising a pair of converged arms, and a member forming a cantilever extension from one of said structures to the other for connecting said structures for relative pivotal movement about an axis extending generally longitudinally of the vehicle to accommodate rising and falling movements of the wheel.

20. In a suspension for a steering ground wheel of a motor vehicle, an upright support structure, a swinging wishbone linkage structure comprising a pair of converged arms, one of said structures having an opening whose axis extends generally longitudinally of the vehicle, an internally threaded bushing disposed in said opening, and a member forming a cantilever extension from the other of said structures and engaging the threads of said bushing for connecting said structures for relative pivotal movement about said axis to accommodate rising and falling movements of the wheel.

FREDERIC W. SLACK.